(12) United States Patent
Enterkin

(10) Patent No.: US 11,516,993 B2
(45) Date of Patent: Dec. 6, 2022

(54) FURNITURE PROTECTOR ASSEMBLY INCLUDING PARTIALLY OVERLAPPING PANELS FOR PROTECTING SURFACES FROM PET-CAUSED DAMAGE

(71) Applicant: PEACHTREE PET LLC, Atlanta, GA (US)

(72) Inventor: Christian Enterkin, Atlanta, GA (US)

(73) Assignee: PEACHTREE PET LLC, Atlanta, GA (US)

( * ) Notice: Subject to any disclaimer, the term of this patent is extended or adjusted under 35 U.S.C. 154(b) by 17 days.

(21) Appl. No.: 17/062,994

(22) Filed: Oct. 5, 2020

(65) Prior Publication Data

US 2021/0037786 A1 Feb. 11, 2021

Related U.S. Application Data

(63) Continuation of application No. 16/178,911, filed on Nov. 2, 2018, now Pat. No. 10,791,711, which is a continuation of application No. 14/921,297, filed on Oct. 23, 2015, now abandoned.

(60) Provisional application No. 62/188,452, filed on Jul. 2, 2015.

(51) Int. Cl.
    *A01K 15/02* (2006.01)
(52) U.S. Cl.
    CPC .................................. *A01K 15/02* (2013.01)
(58) Field of Classification Search
    CPC .... A01K 13/006; A01K 15/006; A01K 15/02; A01K 15/04; A01M 29/30; A01M 29/32; E01F 13/12; E01F 13/123; Y10T 428/24182; Y10T 428/428; Y10T 428/24273
    USPC ............................ 119/712, 753, 756; 238/14
    See application file for complete search history.

(56) References Cited

U.S. PATENT DOCUMENTS

| | | | |
|---|---|---|---|
| 719,509 A | 2/1903 | Rimbey | |
| 2,780,706 A | 2/1957 | Brogan | |
| 3,508,699 A | 4/1970 | Graser | |
| 3,650,881 A | 3/1972 | Giannone | |
| 3,793,928 A | 2/1974 | Wootten | |
| 3,836,075 A | 9/1974 | Botbol | |
| 4,481,155 A * | 11/1984 | Frohwerk | B01J 19/32 428/116 |
| 4,949,216 A | 8/1990 | Djukastein | |
| 5,168,831 A | 12/1992 | Ittershagen et al. | |

(Continued)

OTHER PUBLICATIONS

U.S. Appl. No. 16/178,911, filed Nov. 2, 2018, U.S. Pat. No. 10,791,711, Issued.

(Continued)

*Primary Examiner* — Brady W Frazier
(74) *Attorney, Agent, or Firm* — Alston & Bird LLP

(57) ABSTRACT

Various embodiments provide an apparatuses and methods for protecting surfaces (e.g., furniture) from animal contact. The surface protection apparatus may comprise a plurality of rigid or semi-rigid members extending from a base portion. The protrusions may comprise a plurality of conical members extending from the base portion or may comprise a plurality of panels extending from the base portion. A plurality of apparatuses may be secured relative to one another to provide an enlarged surface area such that large surfaces (e.g., counters) may be covered by the surface protector to prevent pets from lying on the large surfaces.

7 Claims, 7 Drawing Sheets

(56) References Cited

U.S. PATENT DOCUMENTS

| | | |
|---|---|---|
| 5,468,425 A | 11/1995 | Nutter |
| 5,488,981 A | 2/1996 | Burkhart |
| 5,615,524 A | 4/1997 | Costa, Sr. |
| 5,628,079 A | 5/1997 | Kizemchuk et al. |
| 5,702,791 A | 12/1997 | Zegeer |
| 5,797,354 A | 8/1998 | Marschall |
| 6,006,698 A | 12/1999 | Negre |
| 6,095,091 A | 8/2000 | Byrne |
| 6,367,423 B1 | 4/2002 | Scheuer |
| 6,409,418 B1 | 6/2002 | Blair et al. |
| 6,422,539 B1 | 7/2002 | Burton et al. |
| 6,749,922 B1 | 6/2004 | Waselewski |
| 6,993,867 B2 | 2/2006 | Toyota |
| 7,159,257 B1 | 1/2007 | Struthers |
| 7,690,725 B1 | 4/2010 | Rawlings |
| 7,834,769 B2 | 11/2010 | Hinkle et al. |
| 8,245,668 B1 | 8/2012 | Alberti et al. |
| 2002/0092481 A1 | 7/2002 | Spooner |
| 2007/0271859 A1 | 11/2007 | Scheirs |
| 2008/0248236 A1 | 10/2008 | Erez et al. |
| 2008/0277994 A1 | 11/2008 | Gray |
| 2010/0263302 A1 | 10/2010 | Lynch |
| 2011/0290198 A1 | 12/2011 | Pemberton |
| 2013/0224512 A1 | 8/2013 | Zurfluh et al. |
| 2016/0286761 A1 | 10/2016 | Ruckel et al. |

OTHER PUBLICATIONS

U.S. Appl. No. 14/921,297, filed Oct. 23, 2015, 2017-0000085, Abandoned.
U.S. Appl. No. 62/188,452, filed Jul. 2, 2015, Expired.

* cited by examiner

FURNITURE PROTECTOR ASSEMBLY INCLUDING PARTIALLY OVERLAPPING PANELS FOR PROTECTING SURFACES FROM PET-CAUSED DAMAGE

CROSS-REFERENCE TO RELATED APPLICATIONS

This patent application is a continuation of U.S. Nonprovisional patent application Ser. No. 16/178,911, filed Nov. 2, 2018, which application is further a continuation of U.S. Nonprovisional patent application Ser. No. 14/921,297, filed Oct. 23, 2015, which application claims priority to and the benefit of U.S. Provisional Patent Application Ser. No. 62/188,452, filed Jul. 2, 2015; the contents of all of which as are hereby incorporated herein by reference in their entireties.

BACKGROUND

A common problem for pet owners is that their pets (e.g., a dog or a cat) may climb onto furniture and/or other undesired locations and soil the surfaces of the furniture, counters, and/or other undesired locations with pet hair, dander, sweat, and/or other pet related debris. Such pet related debris may cause allergic reactions for those that come into contact with these surfaces.

This problem may be particularly acute for chairs, sofas, and beds which may provide soft, cushioned, and comfortable areas for pets to relax. Pets may be discouraged verbally from resting in undesirable locations, such as on furniture or counters, but such domesticated animals may disobey their owners' desires while the owner is away, and rest in one or more of these undesirable locations. Thus, pet owners are often unable to ensure that their pet does not rest in undesirable locations.

Accordingly, an apparatus (and associated methods of using the same) that discourages pets from contacting and/or resting on surfaces is desirable.

BRIEF SUMMARY

Various embodiments may provide a furniture protector device that inhibits pets (e.g., dogs and/or cats) from sitting on a piece of furniture or other undesirable locations. Various embodiments of the furniture protector device may be adaptable to a variety of shapes and sizes of furniture by expanding and/or contracting to fit various shapes and sized furniture. Associated methods are also provided.

Various embodiments are directed to a method of discouraging pets from resting on a seating portion of a piece of furniture, the method comprising: providing at least two surface protectors stacked relative to one another in a fully overlapped configuration; separating a first surface protector and a second surface protector of the at least two surface protectors relative to one another, such that the first and second surface protectors are no longer in the fully overlapped configuration; positioning the first surface protector on a first section of the seating portion of the piece of furniture; positioning the second surface protector on a second section of the seating portion of the piece of furniture, the first and second sections at least partially overlapping one another such that the rigid planar base portion of the second surface protector partially overlaps the rigid planar base portion of the first surface protector; and connecting the first surface protector and the second surface protector such that a first subset of the plurality of protrusions of the first surface protector extend into corresponding ones of the plurality of protrusions of the second surface protector such that at least a portion of each protrusion of the first subset of the plurality of protrusions of the first surface protector extend above the top surface of the planar base portion of the second surface protector and a second subset of the plurality of protrusions of the first surface protector are positioned outside of the defined perimeter of the second surface protector. The at least two surface protectors each comprise: a rigid planar base portion having a defined perimeter surrounding the rigid planar base portion and defining a top surface and a bottom surface; and a plurality of protrusions extending away from the top surface of the rigid planar base, wherein the plurality of protrusions are spaced on the top surface of the rigid planar base such that an animal paw does not fit between the plurality of protrusions, wherein the plurality of protrusions collectively define an irregular surface that discourages pets from resting on the top surface of the planar base portion.

Various embodiments are directed to a method of discouraging pets from resting on a seating portion of a piece of furniture, the method comprising: providing at least two surface protectors; positioning the first surface protector on a first section of the seating portion of the piece of furniture; positioning the second surface protector on a second section of the seating portion of the piece of furniture, the first and second sections at least partially overlapping one another such that the rigid planar base portion of the second surface protector partially overlaps the rigid planar base portion of the first surface protector; after positioning both the first and the second surface protector, connecting the first surface protector and the second surface protector such that a first subset of the plurality of protrusions of the first surface protector extend into corresponding ones of the plurality of protrusions of the second surface protector such that at least a portion of each protrusion of the first subset of the plurality of protrusions of the first surface protector extend above the top surface of the planar base portion of the second surface protector and a second subset of the plurality of protrusions of the first surface protector are positioned outside of the defined perimeter of the second surface protector; and after connecting the first and second surface protectors, disconnecting the first and second surface protectors relative to one another by: first, selectively removing the second surface protector from the seating portion of a piece of furniture; and secondly, selectively removing the first surface protector from the seating portion of a piece of furniture. Each of the surface protectors comprise: a rigid planar base portion having a defined perimeter surrounding the rigid planar base portion and defining a top surface and a bottom surface; and a plurality of protrusions extending away from the top surface of the rigid planar base, wherein the plurality of protrusions are spaced on the top surface of the rigid planar base such that an animal paw does not fit between the plurality of protrusions, wherein the plurality of protrusions collectively define an irregular surface that discourages pets from resting on the top surface of the planar base portion.

Various embodiments are directed to an apparatus for discouraging pets from resting on surfaces. In various embodiments, the apparatus comprises a planar base portion defining a top surface and a bottom surface; a plurality of hollow protrusions extending away from the top surface of the planar base; and a plurality of connection members spaced along a perimeter of the planar base portion. In various embodiments, the plurality of connection members are configured to engage corresponding connection members of one or more additional apparatuses to form a connected apparatus and the plurality of protrusions are spaced on the top surface of the planar base such that an animal paw does not fit between the plurality of protrusions, and wherein each of the plurality of hollow protrusions have a corresponding hole extending through the bottom surface of the planar base portion and configured to accept a protrusion of a second apparatus therein.

In various embodiments, the protruding members have a conical profile. Moreover, the protruding members may be flexible and/or semi-rigid. Moreover, in various embodiments, the connection members comprise engaging members configured to engage corresponding engagement apertures. In certain embodiments, the connection members are configured to snap into the corresponding engagement apertures of adjacent apparatuses.

Various embodiments are directed to an apparatus for discouraging pets from resting on surfaces. The apparatus may comprise: a planar base portion defining a top surface and a bottom surface; and a plurality of panels extending away from a top surface of the planar base portion. In various embodiments, the plurality of panels are spaced on the top surface of the planar base such that an animal paw does not fit between the plurality of protrusions; and the planar base portion defines a corresponding aperture adjacent each of the plurality of panels, wherein the apertures are configured to accept a panel from an additional apparatus therein to interlock a plurality of panels. In various embodiments, the plurality of panels extend away from the planar base portion at an angle between 0-90 degrees (e.g., at about a 45 degree angle). Moreover, in various embodiments, the surface area of each panel is smaller than the area of the base portion encompassed by the corresponding aperture. The panel may have any of a variety of shapes, such as, for example, a rectangular shape, or a paw shape. Moreover, in various embodiments, the apertures are configured such that substantially identical apparatuses are stackable with the panels of a bottom apparatus of the stack extending through the apertures of a top apparatus of the stack. Moreover, in various embodiments, the apparatus is rigid.

BRIEF DESCRIPTION OF THE SEVERAL VIEWS OF THE DRAWINGS

Reference will now be made to the accompanying drawings, which are not necessarily drawn to scale, and wherein.

DETAILED DESCRIPTION

The present invention will now be described more fully hereinafter with reference to the accompanying drawings, in which some, but not all embodiments of the invention are shown. Indeed, the invention may be embodied in many different forms and should not be construed as limited to the embodiments set forth herein. Rather, these embodiments are provided so that this disclosure will satisfy applicable legal requirements. Like numbers refer to like elements throughout.

Various embodiments are directed to a surface protector for dissuading pets (e.g., dogs and cats) from resting on a piece of furniture (e.g., a chair, sofa, table, and/or the like) or another surface (e.g., a kitchen counter or bathroom counter). In various embodiments, the surface protector comprises a planar base portion having a plurality of protrusions extending therefrom and spaced at intervals such that a pet cannot rest and/or step between the protrusions. Accordingly, when placed on a surface, the plurality of protrusions provide a generally uncomfortable surface that discourages pets from resting and/or walking on the surface on which they are placed. Moreover, in various embodiments, the surface protector may be configured to engage additional surface protectors to provide a generally expandable and configurable protection surface to accommodate various shapes and sizes of furniture and other surfaces on which the surface protector is to be placed.

In various embodiments, the surface protector is lightweight and may be conveniently and inconspicuously stored under furniture or in other storage locations and rapidly replaced onto furniture (or other surfaces) to an operative position, including attaching a plurality of surface protectors relative to one another to protect larger surface areas. Accordingly, the surface protector protects furniture from damage by, for example, preventing animals from sleeping on furniture surfaces.

Accordingly, various embodiments provide a surface protector which deters pets from lying on furniture when a room is unoccupied. The surface protector may be easily removed and may be conveniently and inconspicuously stored under furniture. Moreover, the surface protector may be lightweight and easily positionable and expandable when placed on furniture (or other surfaces). The surface protector may deter pets from lying on furniture (or other surfaces) safely, without harming the animal. Accordingly, the surface protector may prolong the life of furniture (e.g., upholstered furniture) by deterring pets from resting on the furniture.

In various embodiments, a surface protector comprises an array of slanted panels (e.g., rectangular, "paw" shaped, and/or the like) protruding from a base portion at an angle between 0-180 degrees to provide an uncomfortable surface to dissuade animals from laying on the surface on which the surface protector is placed.

Figure 1:
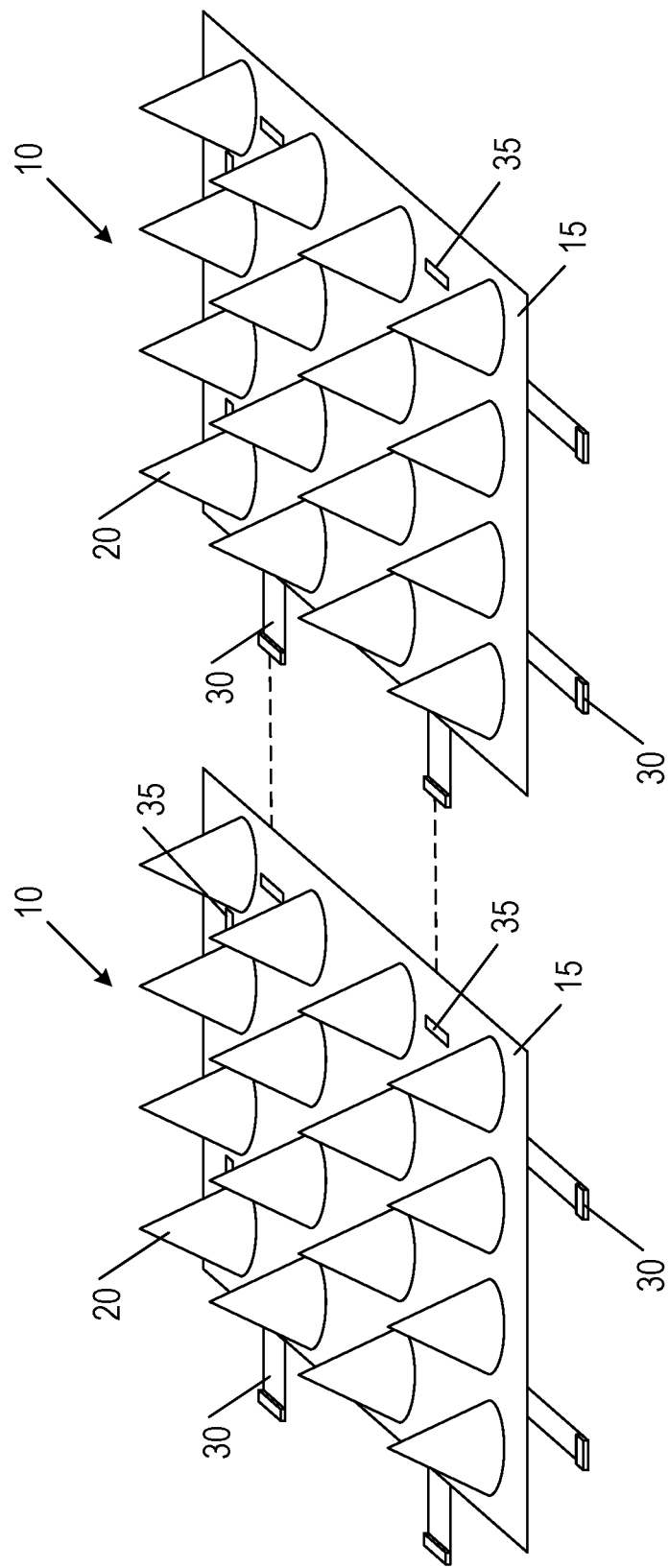
FIG. 1 shows a plurality of surface protectors according to one embodiment.

FIG. 1 illustrates a surface protector according to one embodiment. As shown in FIG. 1, the surface protector 10 comprises a base portion 15 having a plurality of protrusions 20 extending therefrom. In the illustrated embodiment of FIG. 1, the base portion 15 is generally planar, defining a top surface and a bottom surface. As shown in FIG. 1, the base portion 15 defines a generally rectangular (e.g., square) shape, although the base portion 15 may define any of a variety of shapes (e.g., circular, ovular, pentagonal, hexagonal, and/or the like).

Figure 2:
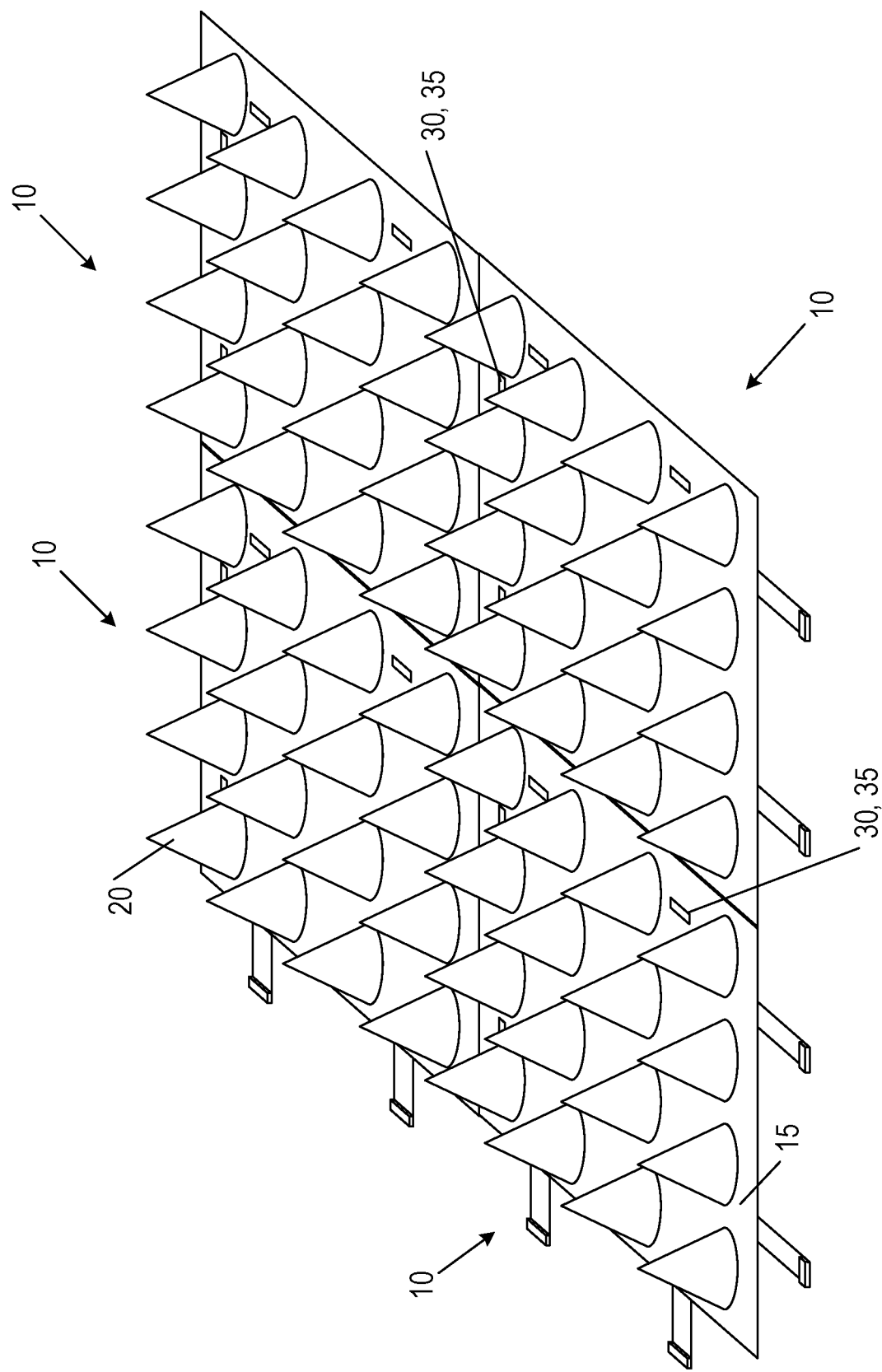
FIG. 2 shows a plurality of surface protectors in an interlocked configuration according to one embodiment.

With reference to FIGS. 1 and 2, which each illustrate a plurality of surface protectors 10 in various states of connection, the surface protectors 10 may comprise one or more connection members 30 extending away from one or more side edges of the base portion 10. Moreover, in the illustrated embodiments of FIGS. 1 and 2, the base portion 10 defines a plurality of corresponding connection receiving portions 35 configured to detachably secure a plurality of surface protectors 10 relative to one another. In the illustrated embodiment of FIG. 1, each of the connection members 30 comprise an elongated portion extending away from the base portion 10, and an engagement member positioned at an end of the elongated portion. The engagement member is configured to engage (e.g., snap into) the connection receiving portion 35 to detachably secure a plurality of surface protectors 10 to one another. As shown in FIG. 2, the connection members 30 and corresponding connection receiving portions 35 are configured such that edges of adjacent surface protectors 10 are adjacent (e.g., in contact) when the plurality of surface protectors 10 are secured relative to one another. As shown in FIG. 1, each surface protector 10 may have either connection members 30 or connection receiving portions 35 corresponding to each edge of the base portion 15 such that more than 2 surface protectors 10 may be secured relative to one another (e.g., as shown in FIG. 2). By permitting a plurality of surface protectors 10 to be secured relative to one another, the plurality of surface protectors 10 may be secured relative to one another to form a generally continuous surface to cover substantially the entirety of the surface on which the surface protector 10 is placed.

As noted above, the base portion 10 may have a generally rectangular (e.g., square) shape such that adjacent surface protectors 10 may be secured relative to one another to provide a substantially continuous surface defined by the plurality of base portions 15 of adjacent surface protectors 10. Although illustrated as defining a square shape having adjacent edges at 90 degree angles relative to one another, base portions 15 according to various embodiments may have any of a variety of interlocking shapes (e.g., pentagonal, hexagonal, and/or the like) such that, when connected together, a plurality of surface protectors 10 form a substantially planar surface.

As shown in FIGS. 1 and 2, the plurality of protrusions 20 may have a generally conical profile extending away from the base portion 15 toward a pointed end. Such conical shape may provide an uncomfortable surface to dissuade pets from laying on the surface on which the surface protector 10 is located. Various embodiments have protrusions 20 having other profiles (e.g., cubical, cylindrical, pyramidal, and/or the like). Indeed, the protrusions 20 may have any profile which provides an uncomfortable surface to dissuade pets from laying on the surface on which the surface protector 10 is placed. In various embodiments, the protrusions 20 may be flexible and may have a rounded tip such that humans and pets are not harmed when contacting the protrusions 20. For example, the protrusions 20 may be configured to deform when a force is applied to the protrusions 20, such that individuals are not harmed when contacting the tip of the protrusions 20.

Moreover, as shown in FIGS. 1 and 2, the plurality of protrusions 20 may be spaced at intervals sufficiently small such that pet paws (e.g., cat paws and/or dog paws) cannot fit between the protrusions. Providing such a small spacing between protrusions 20 ensures that pets cannot walk on the surface on which the surface protector is placed without stepping on the protrusions. Such configuration ensures that the pets cannot simply avoid the potential discomfort of stepping on the protrusions 20 while walking across the surface on which the surface protector 10 is placed, and thus the small spacing between protrusions 20 may further dissuade pets from walking and/or laying on the surface on which the surface protector 10 is placed.

In various embodiments, the base portion 15 and plurality of protrusions 20 comprise a common material and may be formed concurrently through a molding process (e.g., injection molding). Accordingly, the surface protector 10 may comprise a thermoplastic material (e.g., polyvinyl chloride), although the surface protector 10 may comprise any of a variety of materials (e.g., metal, wood, plastic, rubber, and/or the like). In various embodiments, the surface protector 10 may be flexible such that the surface protector 10 does not damage surfaces on which it is placed (e.g., furniture counters, and/or the like). Accordingly, the surface protector 10 may not have sharp corners and/or edges (e.g., the edges of the base portion 15 and/or the tops of the protrusions 20).

Figure 3:
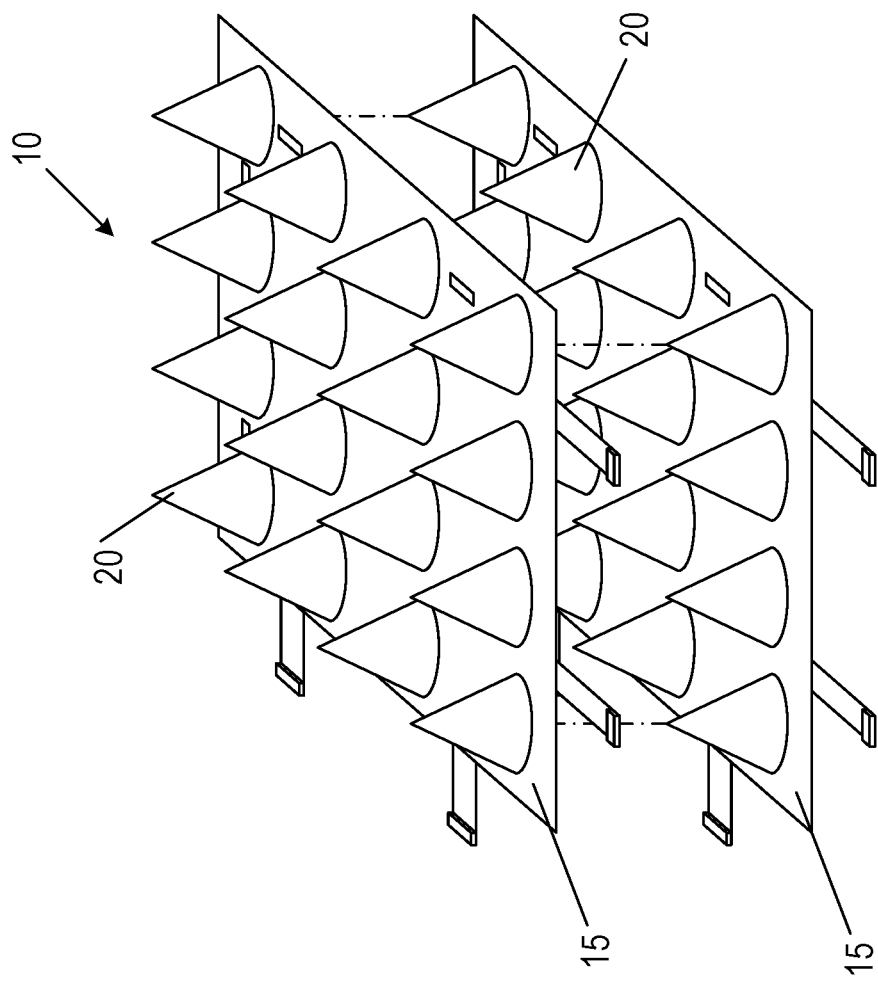
FIG. 3 shows a plurality of surface protectors stacked according to one embodiment.

Moreover, with reference to FIG. 3, the protrusions 20 may be hollow and may have open bottom ends extending through a bottom surface of the base portion 15 such that the surface protectors 10 may be stacked relative to one another for convenient storage of a plurality of surface protectors 10.

Figure 4:
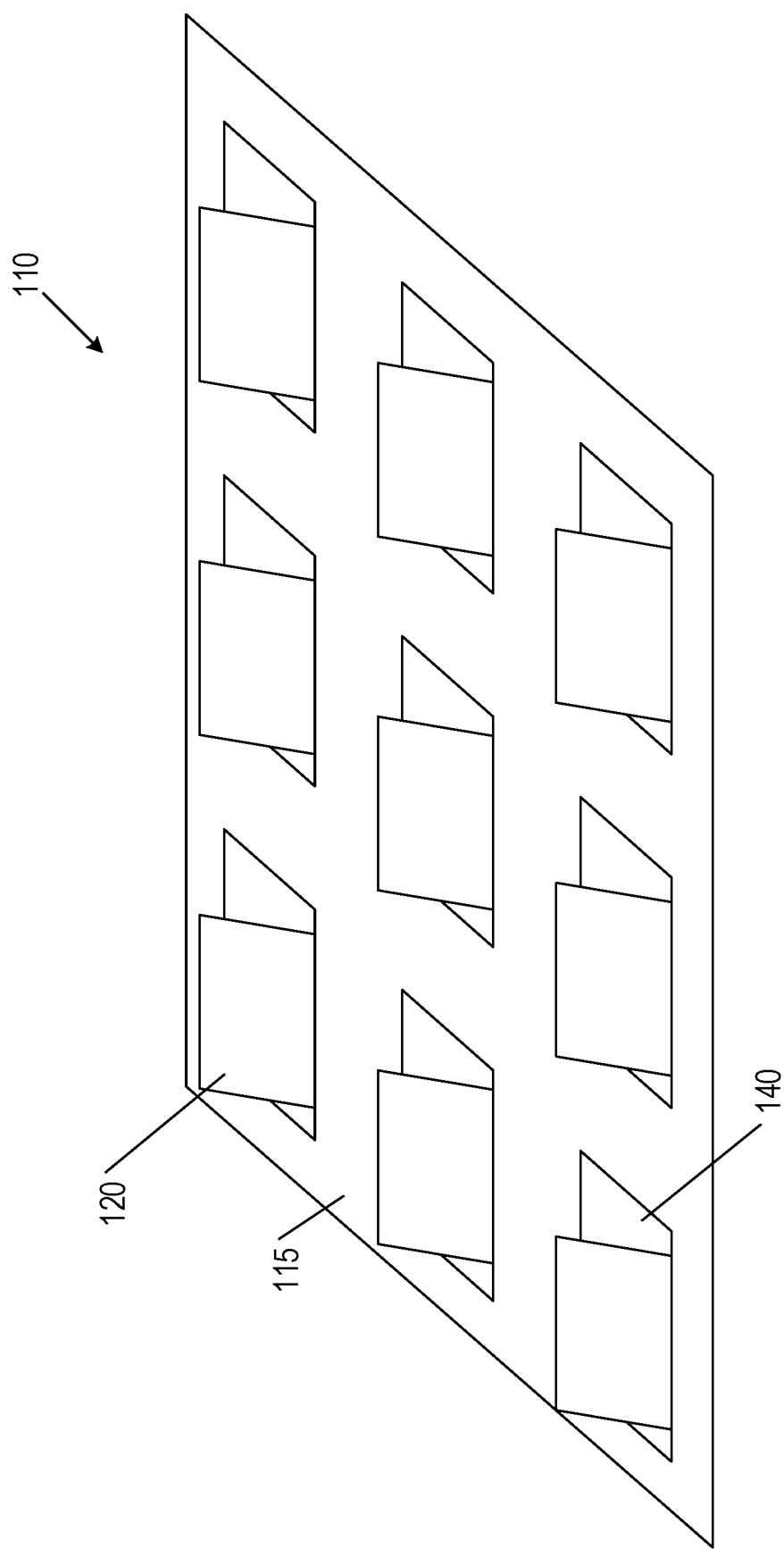
FIG. 4 shows a surface protector according to one embodiment.

FIG. 4 illustrates an embodiment of a surface protector 110 having a plurality of panels extending away from a base portion to provide an uncomfortable surface to dissuade pets from resting on a surface on which the surface protector is placed.

In the illustrated embodiment of FIG. 4, the surface protector defines a base portion 115 having a plurality of panels 120 extending away from the base portion 115 at an angle between 0-180 degrees (e.g., a 45 degree angle). Each of the plurality of panels 120 may correspond to an aperture 140 extending through the base portion 115, and may be positioned above at least a portion of the aperture. Accordingly, as described in greater detail herein, panels 120 from additional surface protectors 110 may be placed such that the panels 120 of the additional surface protectors 110 may extend through the base portion 115 to thereby stack and/or interlock a plurality of surface protectors 110 relative to one another.

Figure 5:
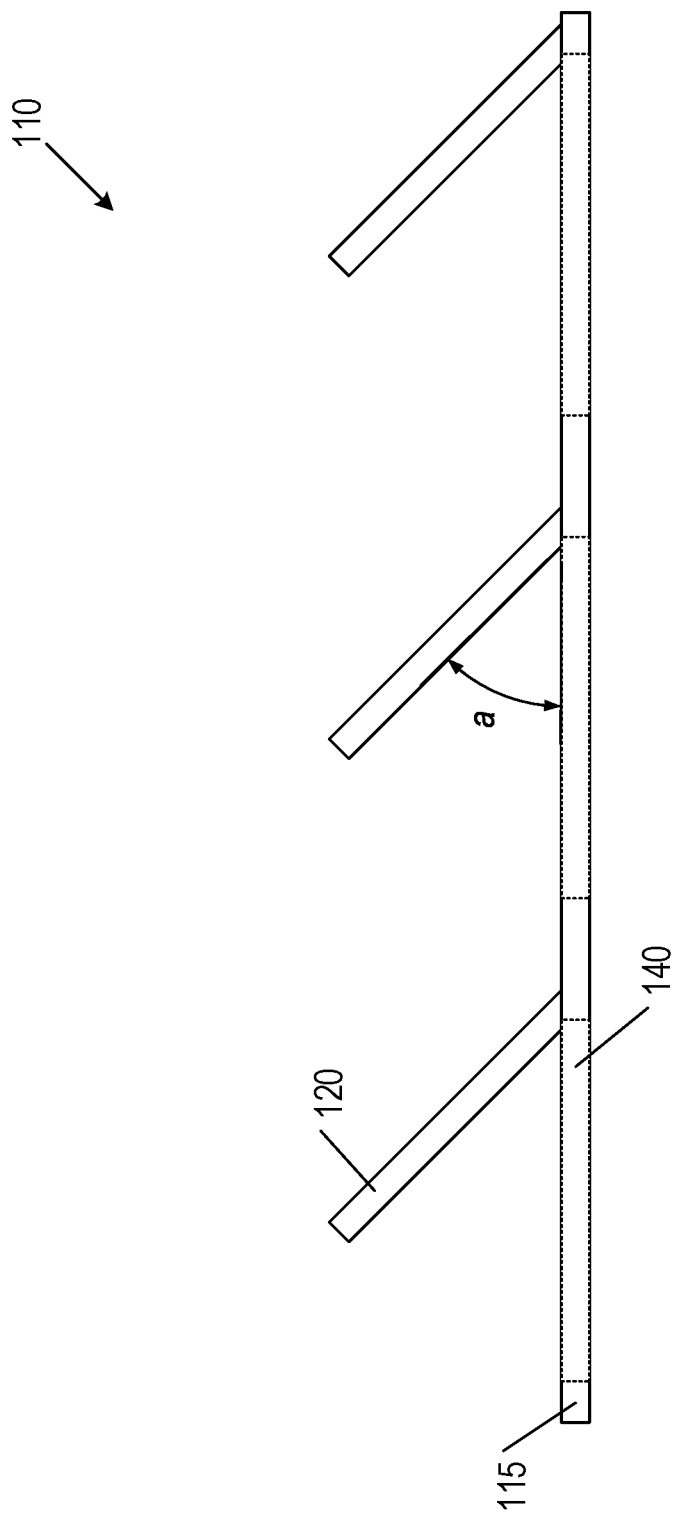
FIG. 5 shows a side view of a surface protector according to one embodiment.

With reference to FIG. 5, the panels 120 extend away from the base portion 115 at an angle α to provide an uncomfortable surface to prevent pets from laying thereon. For example, panels 120 extending away from the base portion 115 at an angle α between 30-55 degrees (e.g., 45 degrees) provide a sufficiently uncomfortable surface to dissuade pets from resting thereon. The panels 120 extending away from the base portion 115 at an angle α provides a generally uneven and non-planar surface such that pets are unable to lay on any generally flat portions of the surface on which the surface protector 110 is placed.

Figure 6:
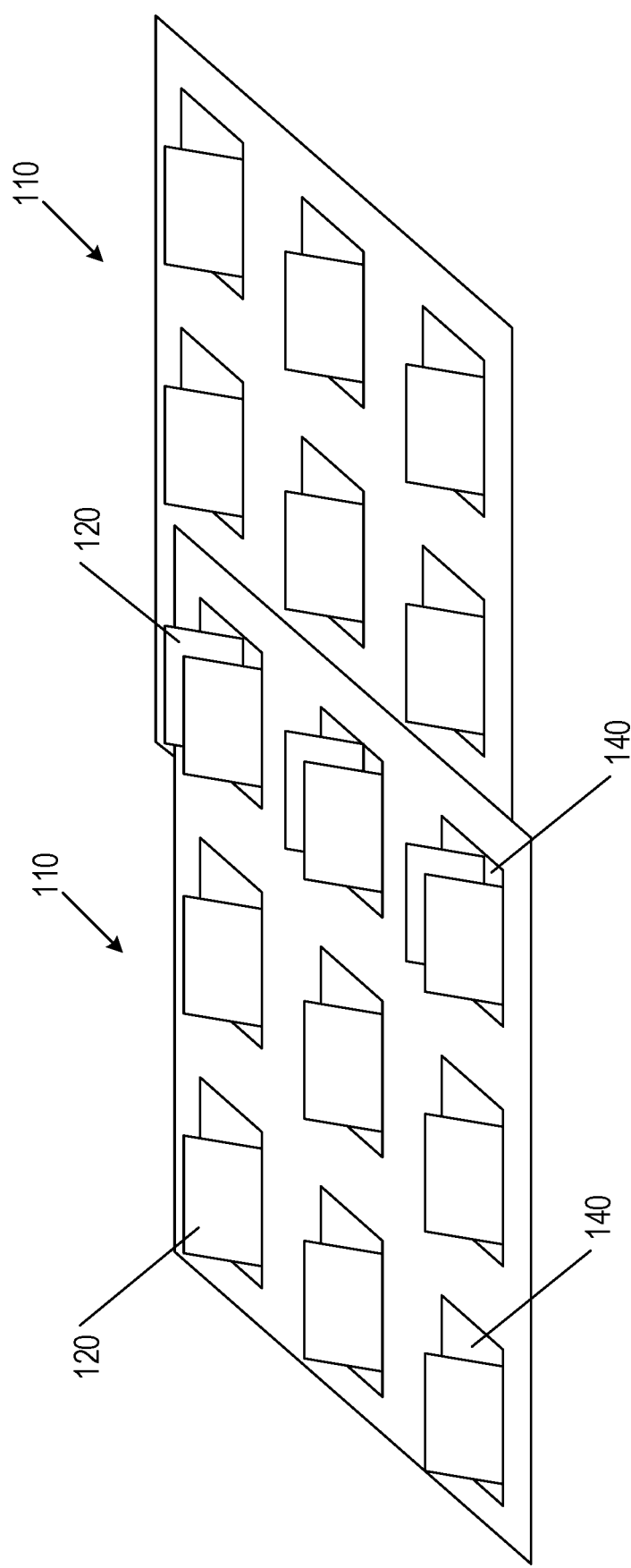
FIG. 6 shows a plurality of furniture protectors interlocked in an expanded configuration according to one embodiment.
Figure 7B:
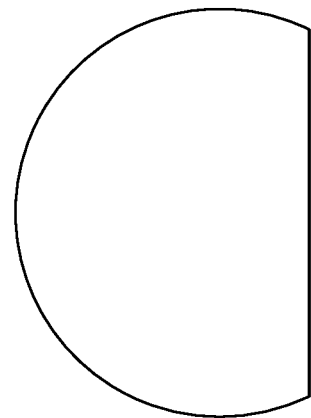
FIGS. 7A-7D show alternative panel shapes according to various embodiments.
Figure 7D:
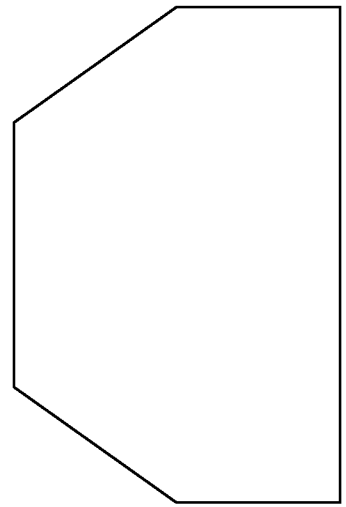
Figure 7A:
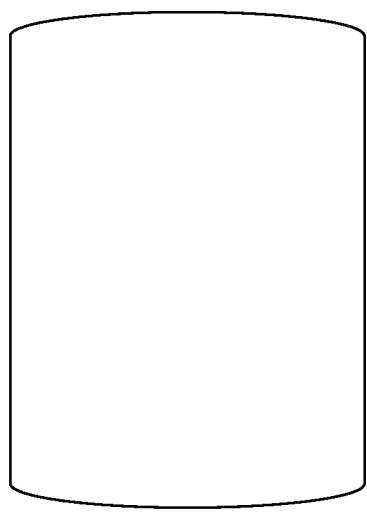
Figure 7C:
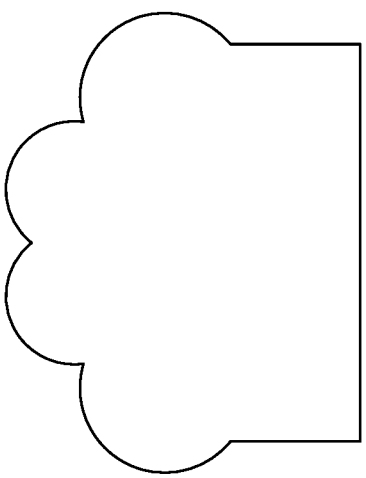

As previously mentioned, a plurality of surface protectors 110 may be interlocked such that the plurality of surface protectors 110 may be positioned to cover a surface having a surface area larger than the base portion 115. FIG. 6 provides an example of how a plurality of surface protectors 110 may be interlocked. As shown in FIG. 6, one or more surface protectors 110 may be overlapped such that a portion of the panels 120 of a bottom surface protector 110 are positioned with reference to a top surface protector 110 such that the panels 120 of the bottom surface protector 110 extend through the apertures 140 of the top surface protector 110. Accordingly, when placed on a surface in such an interlocked configuration, the plurality of surface protectors 110 provide an enlarged surface area that may provide protection over a large surface. In order to disengage the plurality of surface protectors 110, the top surface protector 110 may be lifted off of the bottom surface protector 110 until the panels 120 of the bottom surface protector 110 are completely below the base portion 115 of the top surface protector 110. Accordingly, pets may be unable to disengage the plurality of surface protectors 110 from the interlocked configuration, which may therefore prevent pets from removing the surface protectors 110 from surfaces for which the surface protectors 110 were intended to protect.

A plurality of surface protectors 110 may similarly be stacked for convenient storage by placing a bottom surface protector 110 relative to a top surface protector 110 such that all of the panels 120 of the bottom surface protector 110 extend through corresponding apertures 140 of the top surface protector 110. In various embodiments, the panels 120 and corresponding apertures 140 may be positioned such that a plurality (e.g., three or more) surface protectors 110 may be stacked relative to one another such that the plurality of surface protectors 110 may be conveniently stored in a stack.

With reference now to FIGS. 7A-7D, the panels 120 may have any of a variety of shapes to provide a surface protector 110 having an aesthetically pleasing appearance. For example, the panels 120 may have a generally rectangular profile (e.g., with rounded, chamfered, or squared corners), a generally round profile (e.g., with a flat surface proximate a bottom portion of the panel 120), a "paw"-shaped profile, a polygonal profile, and/or the like. Indeed, any of a variety of shapes may be utilized as the shape of the panels 120, and the examples provided in FIGS. 7A-7D should not be construed as limiting.

CONCLUSION

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

Although not shown, one or more surface engagement features may be secured on a bottom surface of a base portion 15, 115 of a surface protector 10, 110. For example, fabric pads may be secured to a bottom portion of a surface protector in order to prevent the surface protector from scratching or otherwise damaging a surface on which the surface protector is placed (e.g., a wooden chair or table). As yet another example, one or more suction cups, hook-and-loop fasteners (e.g., Velcro fasteners), and/or the like may be secured to a bottom portion of a surface protector in order to provide a secure connection between a surface on which the surface protector is placed and the surface protector itself. Such surface engagement features may thereby further impede the removal of the surface protector from the surface by a pet.

Moreover, various embodiments may additionally comprise one or more edge finishing features configured to provide a smooth and/or aesthetically pleasing edge of the surface protector. Particularly for those surface protectors having connection members 30 extending therefrom, an edge finishing member may provide a smooth and aesthetically pleasing edge to an enlarged configuration of a surface protector. For example, the edge finishing member may comprise a plurality of connection receiving portions 35 to engage a plurality of connection members 30 along an edge of the surface protector. Moreover, the edge protector may define a smooth edge having no connection members 30 extending therefrom. Moreover, in various embodiments, the edge protector may be configured to engage a portion of the surface on which the surface protector is placed. For example, the edge protector may engage a couch cushion and/or the arm of a chair on which the surface protector is placed in order to ensure the surface protector remains properly placed on the surface on which it is placed. For example, the edge protector may have a vertical portion extending in a direction perpendicular to the planar base portion in order to engage one or more generally vertical portions of a piece of furniture or other surface on which the surface protector is placed.

That which is claimed:

1. A furniture protector assembly for discouraging pets from resting on furniture surfaces, the furniture protector assembly comprising:
   a first surface protector; and
   a second surface protector, the second surface protector being partially overlapped with the first surface protector,
   wherein each of the first surface protector and the second surface protector comprises:
      a planar base portion having a defined perimeter surrounding the planar base portion and defining a top surface and a bottom surface of each of the first and second surface protectors; and
      a plurality of planar panels fixedly secured relative to the planar base portion and extending away from the top surface of the planar base portion at an angle between 0-90 degrees, wherein the plurality of planar panels each have a panel width and are spaced apart a distance relative to one another on the top surface of the planar base; and
      wherein the planar base portion defines a corresponding aperture adjacent each of the plurality of panels, wherein each corresponding aperture extends through the planar base portion through the top surface and the bottom surface, and wherein an aperture width of each corresponding aperture is greater than a width of each of the plurality of planar panels; and
   wherein the first surface protector is positioned below the second surface protector such that a first subset of the plurality of planar panels of the first surface protector extend, with a clearance due to a difference between the aperture and panel widths, through corresponding ones of the apertures of the second surface protector such that a portion less than all of each panel of the first subset of the plurality of planar panels of the first surface protector extend above the top surface of the planar base portion of the second surface protector and a second subset of the plurality of planar panels of the first surface protector are positioned outside of the defined perimeter of the second surface protector.

2. The furniture protector of claim 1, wherein the second surface protector is overlapped with the first surface protector such that a combined surface area of the first surface protector and the second surface protector is larger than a total surface area of either the first surface protector or the second surface protector individually.

3. The furniture protector of claim 1, wherein each of the plurality of planar panels are at least substantially identical and each of the plurality of apertures are at least substantially identical.

4. The furniture protector of claim 1, wherein each of the first surface protector and the second surface protector comprise a material selected from the group consisting of: a thermoplastic, a metal, or a wood.

5. The furniture protector of claim 1, wherein each of the plurality of planar panels extend away from the top surface of the planar base portion at an angle of at least 45 degrees.

6. The furniture protector of claim 1, wherein each panel has a paw shape.

7. The furniture protector of claim 1, wherein each aperture has a rectangular shape.

\* \* \* \* \*